(12) United States Patent  
Esser

(10) Patent No.: US 9,956,869 B2
(45) Date of Patent: May 1, 2018

(54) FUEL TANK MADE OF THERMOPLASTIC MATERIAL

(75) Inventor: Klaus Esser, Konigswinter (DE)

(73) Assignee: KAUTEX TEXTRON GMBH & CO. KG, Bonn (DE)

( * ) Notice: Subject to any disclaimer, the term of this patent is extended or adjusted under 35 U.S.C. 154(b) by 65 days.

(21) Appl. No.: 13/812,826

(22) PCT Filed: Jun. 30, 2011

(86) PCT No.: PCT/EP2011/003248
§ 371 (c)(1),
(2), (4) Date: Apr. 22, 2013

(87) PCT Pub. No.: WO2012/013275
PCT Pub. Date: Feb. 2, 2012

(65) Prior Publication Data
US 2013/0213973 A1 Aug. 22, 2013

(30) Foreign Application Priority Data

Jul. 26, 2010 (DE) .................. 10 2010 032 278

(51) Int. Cl.
*B60P 3/00* (2006.01)
*B62D 33/00* (2006.01)
(Continued)

(52) U.S. Cl.
CPC ........ *B60K 15/077* (2013.01); *B29C 47/0019* (2013.01); *B29C 65/609* (2013.01);
(Continued)

(58) Field of Classification Search
CPC ........ B60K 15/077; B60K 2015/03467; B60K 2015/0777; B60K 2015/0775; B65D 90/52
(Continued)

(56) References Cited

U.S. PATENT DOCUMENTS 1,909,734 A * 5/1933 Thwaits ................... 220/563
2,374,332 A * 4/1945 Crawford ............... 220/560.02
(Continued)

FOREIGN PATENT DOCUMENTS

| CN | 201501295 U | 6/2010 |
| DE | 10260952 A1 | 7/2004 |

(Continued)

OTHER PUBLICATIONS

PCT International Search Report and Written Opinion dated Feb. 22, 2012 in corresponding PCT Application No. PCT/EP2011/003248, 8 pgs.
(Continued)

*Primary Examiner* — Andrew T Kirsch
(74) *Attorney, Agent, or Firm* — Grossman, Tucker, Perreault & Pfleger, PLLC

(57) ABSTRACT

Fuel tank made of thermoplastic material comprising baffle components provided therein in the form of at least one baffle element (2) comprising at least one wall portion (4) which is clamped approximately centrally and/or at the end, so that said wall portion may perform relative movements in relation to the tank, caused by splashing movements of the fuel, at least one fastening foot being provided for the clamping, the base thereof being provided with at least one through-hole, through which the fastening foot is riveted and/or welded to the tank wall (2).

20 Claims, 4 Drawing Sheets

(51) Int. Cl.
    *B65D 88/12*     (2006.01)
    *B60K 15/077*     (2006.01)
    *B65D 90/52*     (2006.01)
    *B29C 47/00*     (2006.01)
    *B29C 65/60*     (2006.01)
    *B29C 65/00*     (2006.01)
    *B29C 47/14*     (2006.01)
    *B29C 49/04*     (2006.01)
    *B29C 65/02*     (2006.01)
    *B29K 23/00*     (2006.01)
    *B29L 31/00*     (2006.01)
    *B60K 15/03*     (2006.01)

(52) U.S. Cl.
CPC ............ *B29C 66/532* (2013.01); *B29C 66/61* (2013.01); *B29C 66/723* (2013.01); *B29C 66/7392* (2013.01); *B29C 47/14* (2013.01); *B29C 49/04* (2013.01); *B29C 65/02* (2013.01); *B29C 66/71* (2013.01); *B29C 66/7234* (2013.01); *B29C 66/73921* (2013.01); *B29C 66/8322* (2013.01); *B29K 2023/065* (2013.01); *B29L 2031/7172* (2013.01); *B29L 2031/737* (2013.01); *B60K 15/03177* (2013.01); *B60K 2015/0344* (2013.01); *B60K 2015/03453* (2013.01); *B60K 2015/0775* (2013.01)

(58) Field of Classification Search
USPC ................ 220/563, 562, 905, DIG. 24, 4.13; 137/574
See application file for complete search history.

(56) References Cited

U.S. PATENT DOCUMENTS

| | | | |
|---|---|---|---|
| 2,678,660 A | 5/1954 | Gurin | |
| 2,860,809 A | 11/1958 | Perry | |
| 3,510,624 A * | 5/1970 | Bennett | 219/91.23 |
| 3,645,416 A * | 2/1972 | Main, Jr. | 220/563 |
| 4,444,979 A | 4/1984 | St. Clair et al. | |
| 4,796,773 A * | 1/1989 | Gerhard | 220/563 |
| 4,844,278 A | 7/1989 | Freiwald et al. | |
| 5,308,427 A * | 5/1994 | Duhaime | B29C 65/028 156/245 |
| 6,220,287 B1 | 4/2001 | Wolf | |
| 6,408,874 B1 | 6/2002 | Keller | |
| 6,499,620 B1 * | 12/2002 | Boguet et al. | 220/563 |
| 6,736,282 B2 | 5/2004 | Krogull | |
| 8,122,604 B2 | 2/2012 | Jannot et al. | |
| 2004/0173616 A1 * | 9/2004 | Krogull | 220/563 |
| 2005/0269333 A1 * | 12/2005 | Burrington et al. | 220/562 |
| 2008/0006625 A1 | 1/2008 | Borchert et al. | |
| 2010/0139842 A1 | 6/2010 | Criel et al. | |
| 2010/0224440 A1 | 9/2010 | Fujii | |

FOREIGN PATENT DOCUMENTS

| | | |
|---|---|---|
| DE | 102006059799 A1 | 6/2008 |
| EP | 1101574 A2 * | 5/2001 |
| JP | S5772323 | 5/1982 |
| JP | S58202112 A | 11/1983 |
| JP | 59196320 | 11/1984 |
| JP | 63176720 | 7/1988 |
| JP | S641517 | 1/1989 |
| JP | 2006248367 | 9/2006 |
| KR | 100712411 B | 4/2007 |
| KR | 1020080010494 A | 1/2008 |
| KR | 1020090060809 A | 6/2009 |
| WO | 2010023267 A1 | 3/2010 |

OTHER PUBLICATIONS

Chinese Search Report dated Jan. 2,3 2015, received in corresponding China Application No. 2011800350584, 1 pg.

* cited by examiner

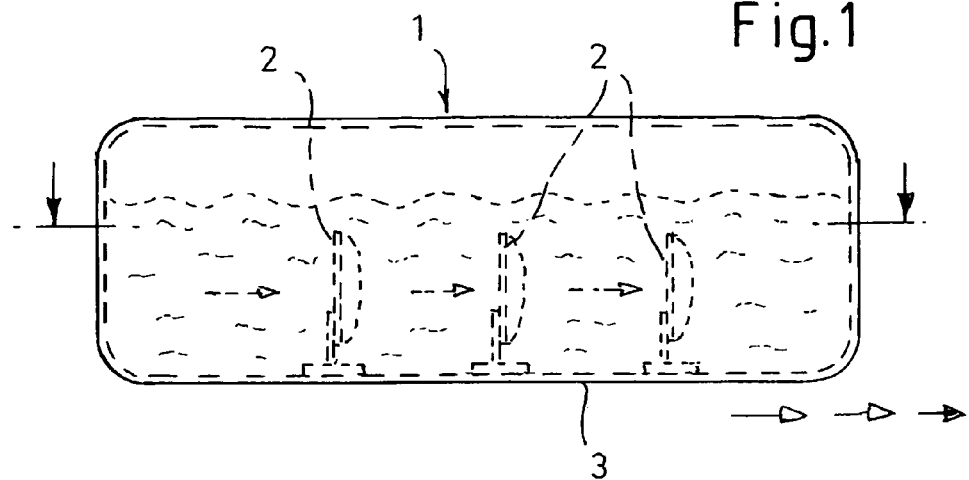
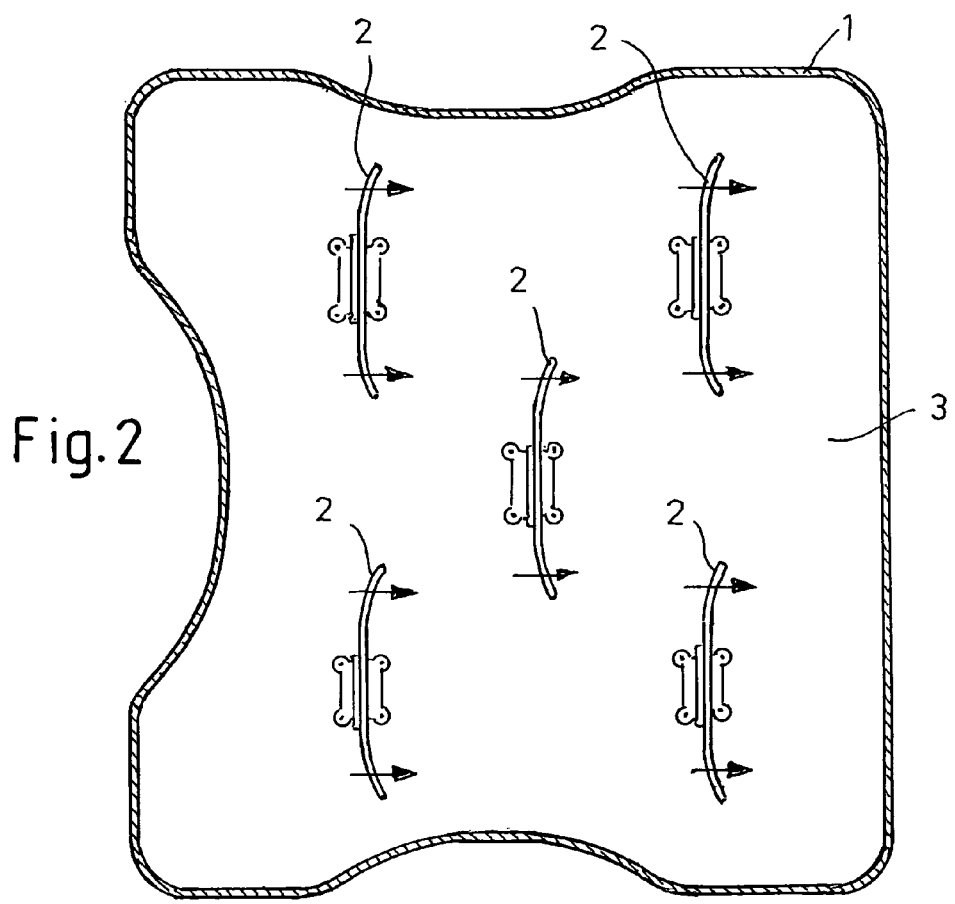

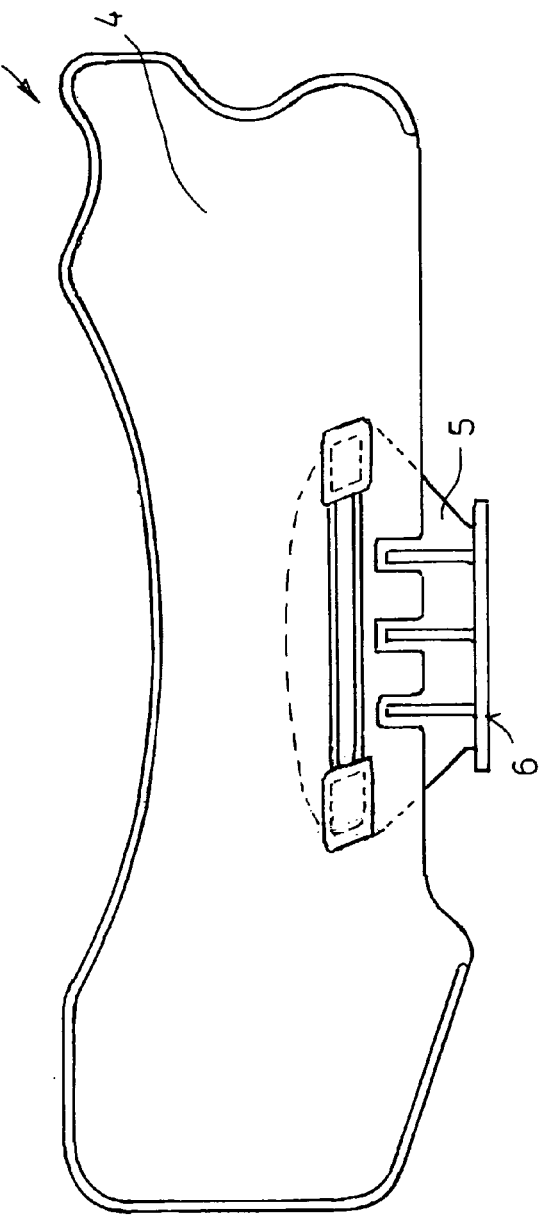
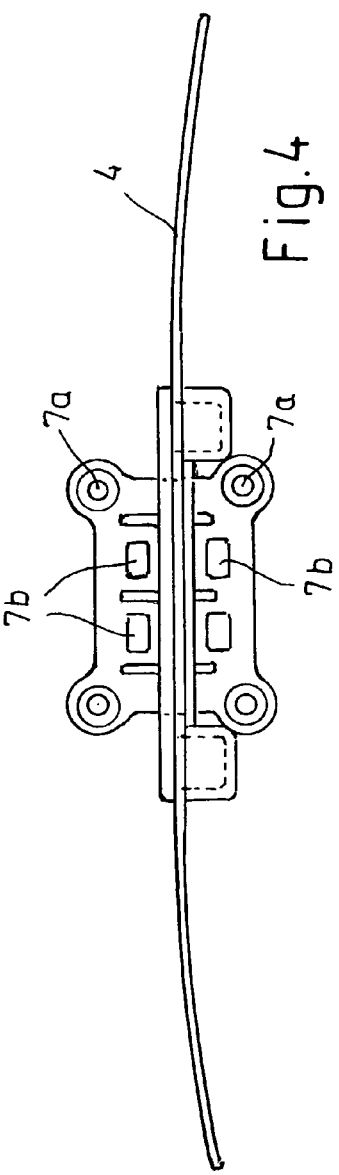
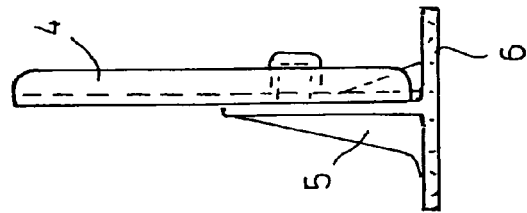

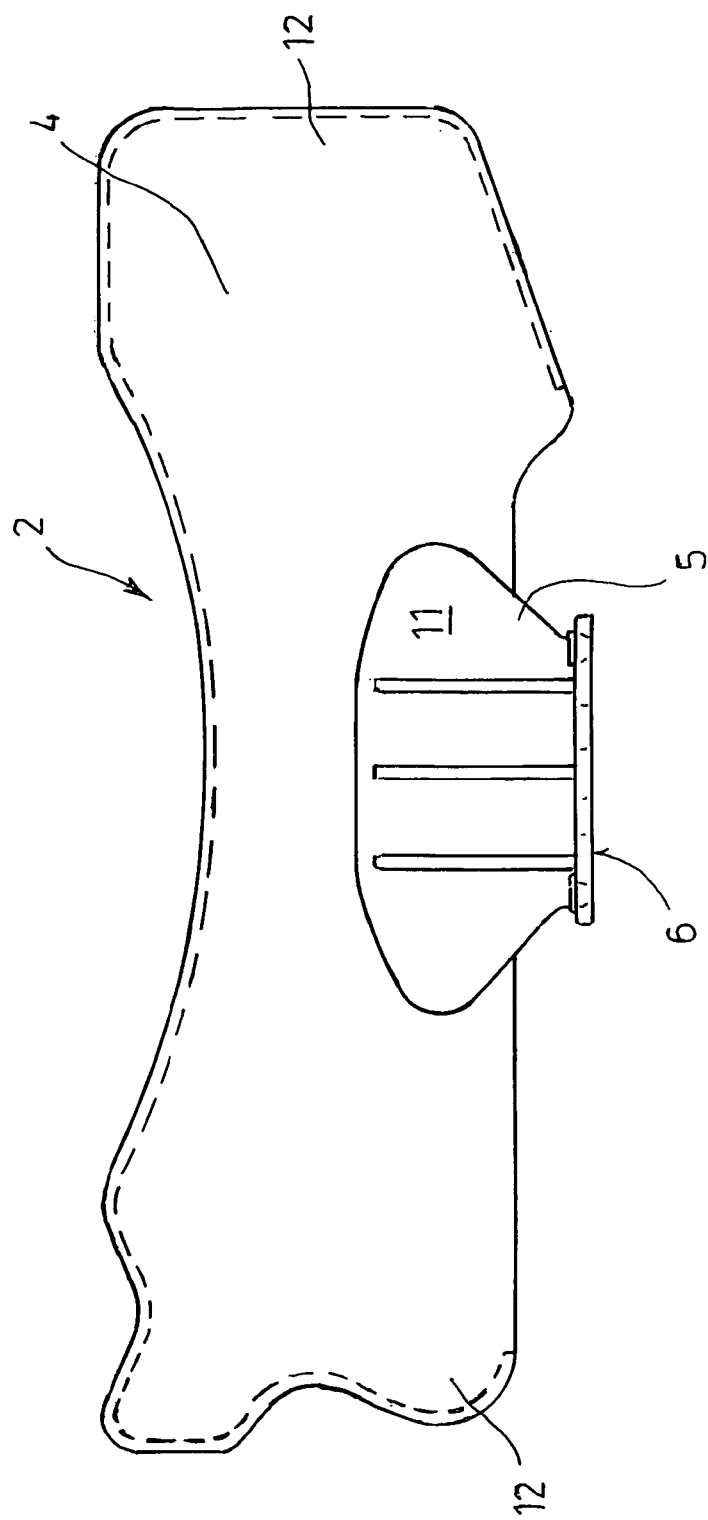

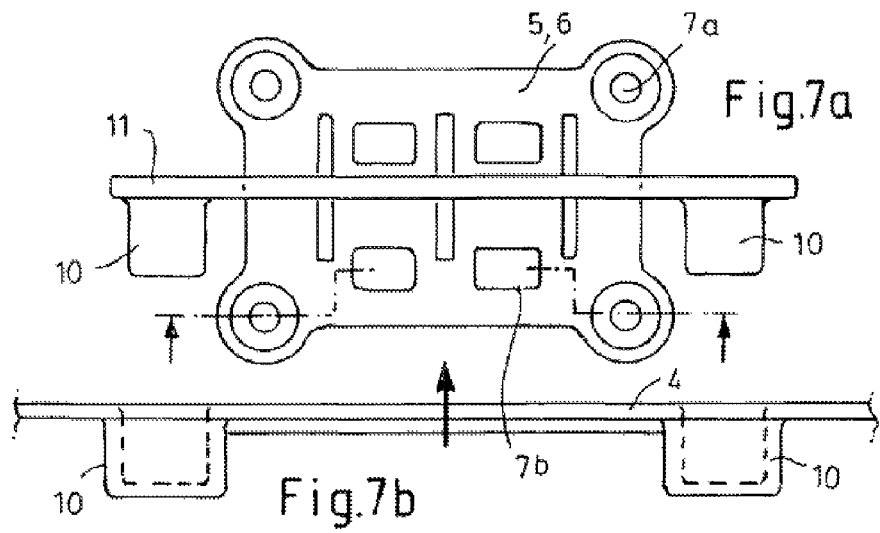
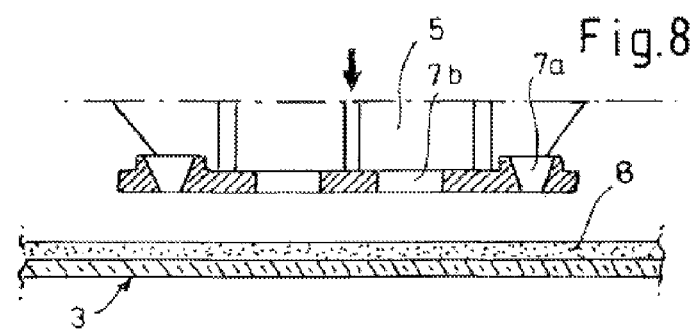
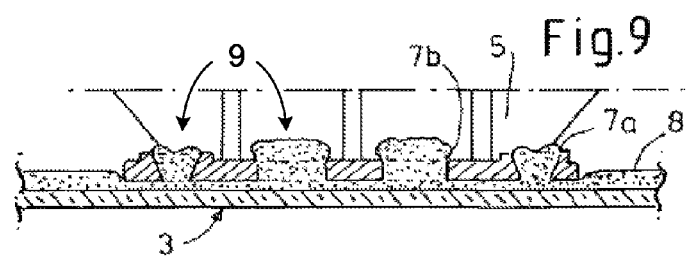

FUEL TANK MADE OF THERMOPLASTIC MATERIAL

The invention relates to a fuel tank made of thermoplastic material comprising at least one baffle element incorporated therein.

In fuel tanks for motor vehicles, measures for preventing splashing noise and/or sloshing noise produced by fuel sloshing to and fro, caused by the driving dynamics of the motor vehicle, play an increasingly important role and namely, in particular, because modern passenger vehicles are becoming quieter due to improved engine encapsulation and improved internal combustion engines. In particular, in hybrid vehicles in which the internal combustion engine of the motor vehicle is not in operation over long driving cycles, background noise occurs particularly in the motor vehicle. With alternate cornering or when accelerating and decelerating the motor vehicle, depending on the filling state of the tank and the tank geometry, greater volumes of fuel are moved to and fro due to the inertia of the fuel inside the fuel tank. The impact of fuel splashing against fixed components of the fuel tank or even the surrounding walls of the tank may occasionally represent a source of disturbing noise.

In order to prevent this, it is known to incorporate annular or even labyrinth-type baffle components in the fuel tank. Said baffle components are generally arranged so that they deflect or slow down the flow of fuel in the fuel tank so as to minimize noise.

For example, so-called baffle rings have proved particularly advantageous, said baffle rings being configured as closed profiled portions extending between the opposing tank walls so that said baffle rings form flow channels between the surrounding walls of the fuel tank in the volume thereof, which produce a substantially directed fuel flow so that a front impact of fuel splashing onto an obstruction extending substantially transversely to the direction of movement, occurs as little as possible. During the production of the fuel tank, it is possible for such baffle rings to have been already integrally formed therein, for example by blow moulding or by introducing into open half-shells made of thermoplastic material, which are joined together to form a closed tank. It is also known to arrange such baffle rings through the inspection opening provided in the fuel tank for retrospectively receiving a conveyor module in the tank, i.e. after the manufacture thereof, during the manufacture or in the course of a retrofitting measure. The baffle elements extending substantially between the large opposing tank walls may, for example by utilizing a resilient restoring movement, be clamped or supported against the tank wall. The anchoring of such baffle elements in the fuel tank generally plays a secondary role due to the geometry thereof.

It is also known, during the extrusion blow-moulding of fuel tanks, initially to introduce interconnected baffle structures in the manner of a ship in a bottle into the tube which has been extruded during production and to arrange and anchor said baffle structures in the product widened in the tool.

The known baffle components are generally all more or less related structures which are effective in terms of flow technology, which extend over a substantial part of the height and even over a substantial part of the width of the relevant fuel tank. The effect of said baffle components is to increase the weight and, as a whole, to rigidify the tank which is a drawback in the event of an accident.

Accordingly, it would be desirable to use baffle elements at any point in the tank, in a targeted and economical manner, so that the particular flow conditions in the tank and the geometry of the tank are taken into account.

U.S. Pat. No. 2,860,809 discloses a baffle for use in connection with a tank containing liquid comprising a liquid deflecting member having a flat surface thereon disposed transversely within said tank and spaced from the interior surface thereof with said flat surface substantially perpendicular the interior of said tank, and a resilient member as well as a flange on said resilient member rigidly attached to said flat surface. The baffle moreover comprises a second flange on said resilient member and means for rigidly attaching said second flange to the interior surface of said tank. U.S. Pat. No. 2,860,809 discloses the provision of a baffle which is resilient within the tank so that it can withstand the weight of the fluid directly and not transmit strain to the side of the tank. The baffle according to U.S. Pat. No. 2,860,809 extends over the substantial part of the height and the width of the fuel tank so that sloshing of fuel probably would introduce enormous bending forces into the wall of the tank if the baffle was ridigly connected to the fuel tank.

U.S. Pat. No. 6,220,287 B1 discloses a fuel which is designed as a rigid tube made of hollow extruded aluminium or graphite composite epoxy. A plurality of baffles are operably attached at different peripheral locations on the inner sidewall of the tank in order to reduce slosh. The baffles include an attachment portion and a curved corrugation connecting the attachment portion at the baffle body such that the baffle body is permited to flex relative to said attachment portion in response to movement of fluid within the tank.

U.S. Pat. No. 2,678,660 discloses a tank adapted to contain a liquid content with a dividing wall, dividing the interior of the tank into two compartments on opposite sides of the wall. The sidewall is provided with a pair of adjacent ports therethrough permiting the free flow of the liquid content from one compartment to the other compartment and a kind of flap valve preventing surging of the liquid content from one compartment to the other trough said ports.

WO 2010/023267 A1 discloses a plastic fuel tank comprising a noise reduction baffle, the baffle being mounted between interfering sections of the fuel tank for suppressing tank deformation. The interfering sections project inwardly into the tank from an upper side and a lower surface thereof, respectively. One of these sections is part of a fixation device which secures the baffle to the tank wall.

The object of the invention is to provide a fuel tank of thermoplastic material having baffle components provided therein which are easy to mount during manufacture of the tank and which are designed such that they can be easily arranged in an ideal layout within the tank and at any point in the tank in a targeted end economical manner so that the particular flow conditions in the tank and the geometry of the tank are taken into account. These and other objects are achieved by a fuel tank according to the attached claims.

The wall portion of the baffle element of the fuel tank according to the invention extends over only one part of the height and width of the fuel tank. To this end, it is provided to connect said wall portion by a material connection and/or positive connection via a fastening foot to the tank wall.

In particular, the baffle element is intended to act inside the fuel tank according to the invention as a "flow brake", the flexible clamping thereof inside the fuel tank acting in an energy-consuming manner. The energy of the fuel splashing inside the tank is converted into deformation energy of the wall portion of the baffle element, which is able to be clamped either at one end or at both ends or approximately centrally. The wall portion of the baffle element may be configured to be closed, but may also have through-holes. The relevant wall portion is expediently configured as a flexible wing which is anchored in the region of its clamped point to the tank wall, so that the energy of the splashing fuel may be converted into deformation energy.

The through-hole of the fastening foot may be passed through by the material of the tank wall, the material passing through the through-hole forming a rivet head which retains the fastening foot. The fastening foot and the through-hole provided therein may be configured so that, when introducing the baffle element into the tank during the moulding thereof, the plasticized tank wall passes through the through-hole and/or when the fastening foot is positioned on the warm-plastic tank wall, the material of the tank wall is driven through the through-hole and thus forms a rivet head "in situ". The rivet head may be produced by a correspondingly advantageous cross-sectional shape of the through-hole. Said rivet head may, however, also have been produced by a tool when introducing the baffle element into the fuel tank.

This is, for example, particularly simple to provide if the fuel tank has been produced in a multi-part tool by extrusion blow-moulding of planar, web-like preforms which have been moulded in a blow-moulding tool in a first method step to form shell-shaped semi-finished products, in a second method step baffle components having been arranged in the still warm-plastic shells in the tool, and in a third method step the shells provided with insert parts being joined together and welded together to form a substantially closed fuel tank.

In an alternative variant of the fuel tank according to the invention, it is provided that the through-hole is passed through by a rivet pin with an integrally formed rivet head, the rivet pin being welded to the tank wall. To this end, for example, it may be provided to introduce a rivet pin made of thermoplastic material, which is compatible in the sense of weldability to the tank wall, into the through-hole of the fastening foot and to weld it to the tank wall in the still warm-plastic state of the tank wall. This may take place by utilizing the melt heat of the tank wall but also by introducing additional welding energy.

In a further alternative embodiment of the fuel tank according to the invention, it is provided that the through-hole is passed through by an additional welding material extruded therein, which in its composition approximately corresponds to the composition of the tank wall, and as a result is compatible therewith for the purpose of welding. Preferably, the fastening foot is provided with a base which has a plurality of through-holes.

In the fuel tank according to the invention, the wall portion of the baffle element is configured as an elastically deformable wing which is clamped in the region of the retention thereof so that in this region the deformability is restricted.

Particularly preferably, the wall portion of the baffle element in the installed position of the fuel tank extends approximately transversely to the direction of travel and permits a deformation caused by the splashing movement of the fuel, in or counter to the direction of travel.

The baffle element according to the invention may, for example, be configured in two parts, the wall portion of the baffle element being latched to the fastening foot.

It is advantageous if inside the fuel tank a plurality of baffle elements are arranged in a suitable layout, for example said baffle elements may be fastened to a tank wall, arranged in several rows offset relative to one another.

As already mentioned above, one or more baffle elements may be configured so that they extend only over one part of the inside height and only over one part of the inside width of the tank volume.

Expediently, during the moulding of the fuel tank the baffle element is welded and/or riveted to the tank wall in one operation.

The fastening foot and the wall portion of the baffle element may consist of thermoplastic material, the material of the fastening foot preferably having a greater bending stiffness than that of the wall portion.

Both the fastening foot and the wall portion may consist of HDPE which, for example, may be welded to the HDPE-based tank wall. Within the scope of the invention, however, the foot element, in particular, may be configured from a different plastics material of greater bending stiffness or even of metal.

The invention is described hereinafter with reference to an exemplary embodiment shown in the drawings, in which:

FIG. 1 shows a cross section through a fuel tank according to the invention,

FIG. 2 shows a section along the lines II-II in FIG. 1,

FIG. 3 shows a side view of a baffle element,

FIG. 4 shows a plan view tilted by 90° of the baffle element shown in FIG. 3,

FIG. 5 shows the view of a front face of the baffle element shown in FIG. 3,

FIG. 6 shows a view corresponding to FIG. 3 of the side of the baffle element concealed in FIG. 3, FIGS. 7a & 7b show an exploded view of the fastening element with the wall portion to be fastened thereto and FIGS. 8 & 9 show schematic views which illustrate the fastening of the fastening foot to the tank wall.

The fuel tank 1 shown in FIG. 1 comprises the conventional functional components for operating a fuel tank, such as the filling state sensor, de-aerating valves and venting valves, a conveyor unit with fuel pump, etc. Moreover, said fuel tank comprises a filler pipe and other tank interfaces which are not shown for reasons of simplicity. In the fuel tank 1, baffle components in the form of baffle elements 2 are arranged which are connected by a material and/or positive connection to the lower tank wall 3 in the installed position. Within the scope of the invention, the baffle elements 2 may also be connected to the upper tank wall in the installed position.

The baffle elements 2 are, for example, arranged in several rows offset relative to one another inside the fuel tank 1, as shown in FIG. 2. Said baffle elements have been introduced into the tank during and/or directly after the moulding of the fuel tank 1. The position and arrangement thereof is freely selected, irrespective of any inspection openings in the fuel tank 1.

The production of the fuel tank 1 according to the invention takes place by extrusion blow-moulding of web-like or sheet-like preforms which either have been obtained by cutting off an extruded tube or by extruding a thermoplastic material through sheet dies. The extrudate and thus also the tank wall 3 of the multi-layered fuel tank 1 consist of a six-layered co-extrudate based on HDPE with at least one barrier layer for hydrocarbons.

The web-like or sheet-like preforms are moulded inside a three-part moulding tool comprising two outer moulds, in each case comprising a cavity and a central tool to form a plastics hollow body. In this case, initially the web-like preforms are moved into the multi-part, open tool, and namely between the outer moulds and a central mould arranged therebetween and/or a central tool arranged therebetween. The outer moulds describe in each case a part of the contour of the product and form together a closed mould cavity. Initially, the outer moulds are closed against the central tool with the interposition of the preforms and then the preforms by the application of differential pressure are placed against the cavities of the blow-moulding tools. Via the central tool which, for example, may comprise component carriers and other devices, insert parts such as for example the aforementioned baffle elements 2 are fastened to the tank walls moulded in the cavities, and namely preferably by utilizing the extrusion heat of the still hot melt material and/or melt heat of the tank wall.

The advantages of this production method result, in particular, in combination with the baffle elements 2 according to the invention. This production method permits a fastening of the baffle elements 2 to at least one tank wall in any suitable layout, as is described below in more detail.

At this point it should be mentioned that the baffle elements 2 naturally are also arranged on opposing tank walls 3, so that said baffle elements protrude alternately from the top and from the bottom into the tank volume.

Each baffle element 2 comprises a substantially flexible wall portion 4 and a fastening foot 5, which may both consist of thermoplastic material, for example an HDPE.

In the exemplary embodiment shown, the fastening foot 5 is latched approximately centrally to the wall portion 4, so that said wall portion in the installed position forms a central clamping of the baffle element. The fastening foot 5 preferably consists of a thermoplastic material which has a greater bending stiffness than the wall portion 4 which, as will be described in more detail below, forms a flexible paddle. The greater bending stiffness of the fastening foot 5 may either be achieved via the type of material or via the material thickness.

The fastening foot 5 has a base 6 which is provided with through-holes 7. Some of these through-holes 7 are configured as funnel-shaped bores 7a, whereas other through-holes are configured as rectangular apertures 7b.

As is visible, for example, from FIGS. 8 and 9, the base 6 of the fastening foot 5 during the introduction of the baffle elements 2 in the fuel tank 1 is applied by pressure onto the still hot melt material of the tank wall 3, so that the inner layer 8 of the tank wall 3 is driven through the through-holes 7a, 7b, and at least in the region of the bores 7a undergoes a widening in the manner of a rivet head. This swelling of the material such that the bores 7a are engaged from behind, may either be promoted by the contour of the bores 7a or be produced by a tool during production, similar to the production of a conventional rivet connection. The material of the rivets thus formed is completely driven through from the inner layer 8 of the tank wall 3. As already mentioned above, instead of such riveting in situ, riveting by means of prefabricated rivets made of thermoplastic material may also be provided.

As may be derived, in particular, from FIGS. 3 and 4 in combination with FIG. 7, the baffle elements 2 are configured in two parts, the flexible wall portion 4 being latched and/or clipped via latching connections to a support surface 11 of the fastening foot 5 extending approximately perpendicular to the base 6. In the installed position, the fastening foot 5 forms a central clamping of the flexible wall portion 4, the free ends 12 thereof being able to be deflected through the movement of the splashing fuel, as shown by way of indication by the arrows in FIG. 2, relative to the fixedly arranged fastening foot 5. The baffle elements 2 and the fastening foot 5 may naturally also be configured integrally/in one piece.

By "flexible" in the meaning of the invention is understood that the length and wall thickness and the nature of the material of the wall portions 4 of the baffle elements 2 are dimensioned so that the free ends 12 of the wall portions 4 may be deflected by the energy of the splashing fuel, so that the splashing movements of the fuel are converted into deformation energy of the wall portions 4.

LIST OF REFERENCE NUMERALS

1 Fuel tank
2 Baffle elements
3 Tank wall
4 Wall portion
5 Fastening foot
6 Base
7 Through-holes
7a Bores
7b Aperture
8 Inner layer
9 Rivets
10 Latching connection
11 Support surface
12 Ends

The invention claimed is:

1. A fuel tank comprising:
baffle components in the form of at least one baffle element within a volume of the fuel tank, wherein the fuel tank is a thermoplastic fuel tank,
the at least one baffle element comprising at least one wall portion retained to a wall of the tank by at least one fastening foot,
wherein the at least one wall portion deforms in response to movements of fuel in the tank,
wherein the at least one fastening foot is fastened to the at least one wall portion of the baffle element,
wherein a base of the fastening foot is provided with at least one through-hole, through which the fastening foot is riveted and/or welded to the wall of the tank,
wherein the wall portion of the baffle element comprises an elastically deformable wing retained in a region of retention thereof by the fastening foot such that, in the region of retention, deformability of the wing is restricted,
wherein the baffle element is configured such that, in its entirety, the baffle element extends only over one part of an inside height and only over one part of an inside width of the tank volume, and
wherein the fastening foot and the wall portion of the baffle element are formed of thermoplastic material, the fastening foot and/or the thermoplastic material of the fastening foot having a greater bending stiffness than that of the wall portion and arranged such that, when fuel is in the tank, the thermoplastic material of the fastening foot is exposed to the fuel within the tank.

2. The fuel tank according to claim 1, wherein the through-hole is passed through by the thermoplastic material of the tank wall, the thermoplastic material passing through the through-hole forming a rivet head which retains the fastening foot to the tank wall.

3. The fuel tank according to claim 1, wherein the through-hole is passed through by a rivet pin with an integrally formed rivet head, the rivet pin being welded to the tank wall.

4. The fuel tank according to claim 1, wherein the through-hole is passed through by an additional welding material, which has a material composition which approximately corresponds to the thermoplastic material of the tank wall.

5. The fuel tank according to claim 1, wherein the wall portion of the baffle element in an installed position of the fuel tank extends approximately transversely to a direction of travel of fuel in the fuel tank and permits a deformation caused by the movement of the fuel, in or counter to a direction of travel of the fuel.

6. The fuel tank according to claim 1, wherein the wall portion of the baffle element is latched to the fastening foot.

7. The fuel tank according to claim 1, wherein a plurality of baffle elements are provided in several rows.

8. The fuel tank according to claim 7, wherein the plurality of baffle elements are provided in several rows which are offset relative to one another.

9. The fuel tank according to claim 1, wherein the fuel tank is moulded, and during and/or after the moulding of the fuel tank the baffle element is welded and/or riveted to the tank wall in one operation.

10. The fuel tank according to claim 1, wherein the at least one fastening foot is fastened directly to the wall portion of the baffle element.

11. A fuel tank comprising:
baffle components in the form of at least one baffle element within a volume of the fuel tank, wherein the fuel tank is a thermoplastic fuel tank,
the at least one baffle element comprising at least one wall portion retained to a wall of the tank by a fastening foot fastened to a region of an inner side of the wall of the tank,
wherein the at least one wall portion deforms in response to movements of fuel in the tank and, when fuel is in the tank, the inner side of the wall of the tank is exposed to the fuel,
wherein a base of the fastening foot is provided with at least one through-hole, through which the fastening foot is riveted and/or welded to the wall of the tank,
wherein the wall portion of the baffle element comprises an elastically deformable wing retained in a region of retention thereof by the fastening foot such that, in the region of retention, deformability of the wing is restricted,
wherein the baffle element is configured such that, in its entirety, the baffle element extends only over one part of an inside height and only over one part of an inside width of the tank volume, and
wherein the fastening foot and the wall portion of the baffle element are formed of thermoplastic material, the fastening foot and/or the thermoplastic material of the fastening foot having a greater bending stiffness than that of the wall portion and arranged such that, when fuel is in the tank, the thermoplastic material of the fastening foot is exposed to the fuel within the tank.

12. The fuel tank according to claim 11, wherein the through-hole is passed through by the thermoplastic material of the tank wall, the thermoplastic material passing through the through-hole forming a rivet head which retains the fastening foot to the tank wall.

13. The fuel tank according to claim 11, wherein the through-hole is passed through by a rivet pin with an integrally formed rivet head, the rivet pin being welded to the tank wall.

14. The fuel tank according to claim 11, wherein the through-hole is passed through by an additional welding material, which in has a material composition approximately corresponds to the thermoplastic material of the tank wall.

15. The fuel tank according to claim 11, wherein the wall portion of the baffle element in an installed position of the fuel tank extends approximately transversely to a direction of travel of fuel in the fuel tank and permits a deformation caused by the movement of the fuel, in or counter to a direction of travel of the fuel.

16. The fuel tank according to claim 11, wherein the wall portion of the baffle element is latched to the fastening foot.

17. The fuel tank according to claim 11, wherein a plurality of baffle elements are provided in several rows.

18. The fuel tank according to claim 17, wherein the plurality of baffle elements are provided in several rows which are offset relative to one another.

19. The fuel tank according to claim 11, wherein the fuel tank is moulded, and during and/or after the moulding of the fuel tank the baffle element is welded and/or riveted to the tank wall in one operation.

20. A fuel tank comprising:
baffle components in the form of at least one baffle element within a volume of the fuel tank, wherein the fuel tank is a thermoplastic fuel tank,
the at least one baffle element comprising at least one wall portion retained to a wall of the tank by a fastening foot fastened to a region of an inner side of the wall of the tank,
wherein the at least one wall portion deforms in response to movements of fuel in the tank and, when fuel is in the tank, the inner side of the wall of the tank is exposed to the fuel,
wherein a base of the fastening foot is provided with at least one through-hole, through which the fastening foot is riveted and/or welded to the wall of the tank,
wherein the wall portion of the baffle element comprises an elastically deformable wing,
wherein the baffle element is configured such that, in its entirety, the baffle element extends only over one part of an inside height and only over one part of an inside width of the tank volume, and
wherein the fastening foot and the wall portion of the baffle element are formed of thermoplastic material, and arranged such that, when fuel is in the tank, the thermoplastic material of the fastening foot is exposed to the fuel within the tank.

* * * * *